(12) United States Patent
Xu

(10) Patent No.: US 9,818,355 B2
(45) Date of Patent: Nov. 14, 2017

(54) DISPLAY PANEL AND DISPLAY DEVICE

(71) Applicant: Shenzhen China Star Optoelectronics Technology Co., Ltd., Shenzhen, Guangdong (CN)

(72) Inventor: Xiangyang Xu, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 61 days.

(21) Appl. No.: 14/905,857

(22) PCT Filed: Jul. 3, 2015

(86) PCT No.: PCT/CN2015/083243
§ 371 (c)(1),
(2) Date: Jan. 18, 2016

(87) PCT Pub. No.: WO2016/169127
PCT Pub. Date: Oct. 27, 2016

(65) Prior Publication Data
US 2017/0110073 A1    Apr. 20, 2017

(30) Foreign Application Priority Data

Apr. 22, 2015 (CN) .......................... 2015 1 0193317

(51) Int. Cl.
*G09G 3/36*        (2006.01)
*G02F 1/1368*    (2006.01)
(Continued)

(52) U.S. Cl.
CPC ......... *G09G 3/3614* (2013.01); *G02F 1/1368* (2013.01); *G02F 1/134336* (2013.01);
(Continued)

(58) Field of Classification Search
CPC ............... G09G 3/3614; G09G 3/3607; G09G 2320/0247; G09G 2300/0443;
(Continued)

(56) References Cited

U.S. PATENT DOCUMENTS

2010/0053052 A1* 3/2010 Shimoshikiryoh .. G09G 3/3607
345/89
2010/0149227 A1* 6/2010 Tomizawa ........... G09G 3/3648
345/694

(Continued)

*Primary Examiner* — Premal Patel
(74) *Attorney, Agent, or Firm* — Andrew C. Cheng

(57) ABSTRACT

A display device has a display panel. The display panel comprises multiple pixels arranged in a matrix. A TFT corresponding to the pixels is driven by AC voltage. Each pixel includes a first color sub-pixel, a second color sub-pixel and a third color sub-pixel arranged in sequence along a first direction. The first color sub-pixel includes a first sub-sub pixel and a second sub-sub pixel arranged along a second direction. The second color sub-pixel includes a third sub-sub pixel and a fourth sub-sub pixel arranged along the second direction. The third color sub-pixel includes a fifth sub-sub pixel and a sixth sub-sub pixel arranged along the second direction. The adjacent sub-sub pixels are supplied different voltages with opposite polarities. The sum of the brightness of the two sub-sub pixels of each sub-pixel are the same before and after the polarity of the voltage is changed.

18 Claims, 3 Drawing Sheets

(51) Int. Cl.
*G02F 1/1362* (2006.01)
*G02F 1/1343* (2006.01)

(52) U.S. Cl.
CPC ..... *G02F 1/136286* (2013.01); *G09G 3/3607* (2013.01); *G02F 2001/134345* (2013.01); *G02F 2201/123* (2013.01); *G02F 2201/52* (2013.01); *G09G 2300/0443* (2013.01); *G09G 2320/0247* (2013.01)

(58) Field of Classification Search
CPC ......... G02F 1/134336; G02F 1/136286; G02F 1/1368; G02F 2201/52; G02F 2201/123; G02F 2001/134345
See application file for complete search history.

(56) References Cited

U.S. PATENT DOCUMENTS

| | | | | |
|---|---|---|---|---|
| 2012/0268357 A1* | 10/2012 | Shih | ................ | G09G 3/3607 345/88 |
| 2014/0266995 A1* | 9/2014 | Cho | ................ | G09G 3/3607 345/88 |
| 2015/0109347 A1* | 4/2015 | Wen | ................ | G09G 3/3607 345/690 |
| 2016/0155407 A1* | 6/2016 | Gass | ................ | G09G 3/3648 345/691 |

* cited by examiner

DISPLAY PANEL AND DISPLAY DEVICE

CROSS-REFERENCE TO RELATED APPLICATIONS

This application claims the priority of Chinese Patent Application No. 201510193317.6, entitled "display panel and display device", filed on Apr. 22, 2015, the disclosure of which is incorporated herein by reference in its entirety.

FIELD OF THE INVENTION

The present invention relates to a display technical field, especially to a display panel and a display device.

BACKGROUND OF THE INVENTION

A liquid crystal display (LCD) device a common electronic apparatus and is widely used because it is light and has wide visual angle. An LCD panel is an important component in the LCD device. During the manufacturing process of the liquid crystal in the LCD panel, some movable ions are unavoidably residual during the manufacturing process of the liquid crystal because the liquid crystal cannot be purified completely. When the LCD panel is supplied a DC voltage, the moveable ions are attracted by the electric charges having opposite polarities and move to the electrode. Then they moves to the interface between the liquid crystal and the alignment film Those ions moving to the interface forms an internal electromagnetism with the opposite electric charges on the other electrode. Even though no voltage is supplied, the arrangement of the liquid crystal is different with the pre-arrangement because of the internal electric field to form image sticking.

SUMMARY OF THE INVENTION

The present invention provides a display panel. The display panel comprises multiple pixels arranged in a matrix. A thin film transistor (TFT) corresponding to the pixels are driven by AC voltage. Each pixel includes a first color sub-pixel, a second color sub-pixel and a third color sub-pixel arranged in sequence along a first direction. The first color sub-pixel includes a first sub-sub pixel and a second sub-sub pixel arranged along a second direction. The second color sub-pixel includes a third sub-sub pixel and a fourth sub-sub pixel arranged along a second direction. The third color sub-pixel includes a fifth sub-sub pixel and a sixth sub-sub pixel arranged along a second direction. The adjacent sub-sub pixels are supplied different voltages with opposite polarities. When polarity of the voltage supplied to the sub-sub pixels of each sub-pixel is changed, the sum of the brightness of the two sub-sub pixels of each sub-pixel are the same before and after the polarity of the voltage changed.

Selectively, when the first sub-sub pixel and the second sub-sub pixel are supplied respectively a first polarity voltage and a second polarity voltage, the sum of the brightness of the first sub-sub pixel and the second sub-sub pixel is a first brightness. When the first sub-sub pixel and the second sub-sub pixel are supplied respectively a second polarity voltage and a first polarity voltage, the sum of the brightness of the first sub-sub pixel and the second sub-sub pixel is a second brightness. The first brightness is equal to the second brightness. The voltage values of the first polarity voltage and the second polarity voltage are the same but the polarities of the first polarity voltage and the second polarity voltage are opposite.

Selectively, the display panel further comprises multiple data lines and multiple gate lines arranged in a matrix. Each data line aligns with the first direction. Each gate line aligns with the second direction. Each first color sub-pixel corresponds to a first sharing TFT, a first TFT and a second TFT. A gate of the first sharing TFT electrically connects to a first gate line. A drain and a source of the first sharing TFT respectively connect to a pixel electrode of the first sub-sub pixel and a pixel electrode of the second sub-sub pixel. A gate, a source and a drain of the first TFT respectively connect to a second gate line, a first data line and the pixel electrode of the first sub-sub pixel. A gate, a source and a drain of the second TFT respectively connect to the second gate line, a second data line and the pixel electrode of the second sub-sub pixel.

Selectively, when the third sub-sub pixel and the fourth sub-sub pixel are supplied respectively the first polarity voltage and the second polarity voltage, the sum of the brightness of the third sub-sub pixel and the fourth sub-sub pixel is a third brightness. When the third sub-sub pixel and the fourth sub-sub pixel are supplied respectively the second polarity voltage and the first polarity voltage, the sum of the brightness of the third sub-sub pixel and the fourth sub-sub pixel is a fourth brightness. The third brightness is equal to the fourth brightness.

Selectively, each second color sub-pixel corresponds to a second sharing TFT, a third TFT and a fourth TFT. A gate of the second sharing TFT electrically connects to the second gate line. A drain and a source of the second sharing TFT respectively connect to a pixel electrode of the third sub-sub pixel and a pixel electrode of the fourth sub-sub pixel. A gate, a source and a drain of the third TFT respectively connect to a third gate line, the first data line and the pixel electrode of the third sub-sub pixel. A gate, a source and a drain of the fourth TFT respectively connect to the third gate line, the second data line and the pixel electrode of the fourth sub-sub pixel.

Selectively, when the fifth sub-sub pixel and the sixth sub-sub pixel are supplied respectively the first polarity voltage and the second polarity voltage, the sum of the brightness of the fifth sub-sub pixel and the sixth sub-sub pixel is a fifth brightness. When the fifth sub-sub pixel and the sixth sub-sub pixel are supplied respectively the second polarity voltage and the first polarity voltage, the sum of the brightness of the fifth sub-sub pixel and the sixth sub-sub pixel is a sixth brightness. The fifth brightness is equal to the sixth brightness.

Selectively, each third color sub-pixel corresponds to a third sharing TFT, a fifth TFT and a sixth TFT. A gate of the third sharing TFT electrically connects to the third gate line. a drain and a source of the third sharing TFT respectively connect to a pixel electrode of the fifth sub-sub pixel and a pixel electrode of the sixth sub-sub pixel. A gate, a source and a drain of the fifth TFT respectively connect to a fourth gate line, the first data line and the pixel electrode of the fifth sub-sub pixel. A gate, a source and a drain of the sixth TFT respectively connect to the fourth gate line, the second data line and the pixel electrode of the sixth sub-sub pixel.

Selectively, the first color sub-pixels, the second color sub-pixels and the third color pixels are respectively red, green and blue in any combination.

Selectively, the first direction is a row direction and the second direction is a column direction.

Selectively, the first direction is a column direction and the second direction is a row direction.

The present invention also provides a display device. The display device comprises a display panel. The display panel comprises multiple pixels arranged in a matrix. A TFT corresponding to the pixels is driven by AC voltage. Each pixel includes a first color sub-pixel, a second color sub-pixel and a third color sub-pixel arranged in sequence along a first direction. The first color sub-pixel includes a first sub-sub pixel and a second sub-sub pixel arranged along a second direction. The second color sub-pixel includes a third sub-sub pixel and a fourth sub-sub pixel arranged along the second direction. The third color sub-pixel includes a fifth sub-sub pixel and a sixth sub-sub pixel arranged along the second direction. The adjacent sub-sub pixels are supplied different voltages with opposite polarities. When polarity of the voltage supplied to the sub-sub pixels of each sub-pixel is changed, the sum of the brightness of the two sub-sub pixels of each sub-pixel are the same before and after the polarity of the voltage is changed.

Selectively, when the first sub-sub pixel and the second sub-sub pixel are supplied respectively a first polarity voltage and a second polarity voltage, the sum of the brightness of the first sub-sub pixel and the second sub-sub pixel is a first brightness. When the first sub-sub pixel and the second sub-sub pixel are supplied respectively a second polarity voltage and a first polarity voltage, the sum of the brightness of the first sub-sub pixel and the second sub-sub pixel is a second brightness. The first brightness is equal to the second brightness. The voltage values of the first polarity voltage and the second polarity voltage are the same but the polarities of the first polarity voltage and the second polarity voltage are opposite.

Selectively, the display panel further comprises multiple data lines and multiple gate lines arranged in a matrix. Each data line aligns with the first direction. Each gate line aligns with the second direction. Each first color sub-pixel corresponds to a first sharing TFT, a first TFT and a second TFT. A gate of the first sharing TFT electrically connects to a first gate line. A drain and a source of the first sharing TFT respectively connect to a pixel electrode of the first sub-sub pixel and a pixel electrode of the second sub-sub pixel. A gate, a source and a drain of the first TFT respectively connect to a second gate line, a first data line and the pixel electrode of the first sub-sub pixel. A gate, a source and a drain of the second TFT respectively connect to the second gate line, a second data line and the pixel electrode of the second sub-sub pixel.

Selectively, when the third sub-sub pixel and the fourth sub-sub pixel are supplied respectively the first polarity voltage and the second polarity voltage, the sum of the brightness of the third sub-sub pixel and the fourth sub-sub pixel is a third brightness. When the third sub-sub pixel and the fourth sub-sub pixel are supplied respectively the second polarity voltage and the first polarity voltage, the sum of the brightness of the third sub-sub pixel and the fourth sub-sub pixel is a fourth brightness. The third brightness is equal to the fourth brightness.

Selectively, each second color sub-pixel corresponds to a second sharing TFT, a third TFT and a fourth TFT. A gate of the second sharing TFT electrically connects to the second gate line. A drain and a source of the second sharing TFT respectively connect to a pixel electrode of the third sub-sub pixel and a pixel electrode of the fourth sub-sub pixel. A gate, a source and a drain of the third TFT respectively connect to a third gate line, the first data line and the pixel electrode of the third sub-sub pixel. A gate, a source and a drain of the fourth TFT respectively connect to the third gate line, the second data line and the pixel electrode of the fourth sub-sub pixel.

Selectively, when the fifth sub-sub pixel and the sixth sub-sub pixel are supplied respectively the first polarity voltage and the second polarity voltage, the sum of the brightness of the fifth sub-sub pixel and the sixth sub-sub pixel is a fifth brightness. When the fifth sub-sub pixel and the sixth sub-sub pixel are supplied respectively the second polarity voltage and the first polarity voltage, the sum of the brightness of the fifth sub-sub pixel and the sixth sub-sub pixel is a sixth brightness. The fifth brightness is equal to the sixth brightness.

Selectively, each third color sub-pixel corresponds to a third sharing TFT, a fifth TFT and a sixth TFT. A gate of the third sharing TFT electrically connects to the third gate line. a drain and a source of the third sharing TFT respectively connect to a pixel electrode of the fifth sub-sub pixel and a pixel electrode of the sixth sub-sub pixel. A gate, a source and a drain of the fifth TFT respectively connect to a fourth gate line, the first data line and the pixel electrode of the fifth sub-sub pixel. A gate, a source and a drain of the sixth TFT respectively connect to the fourth gate line, the second data line and the pixel electrode of the sixth sub-sub pixel.

Selectively, the first color sub-pixels, the second color sub-pixels and the third color pixels are respectively red, green and blue in any combination.

Selectively, the first direction is a row direction and the second direction is a column direction.

Selectively, the first direction is a column direction and the second direction is a row direction.

Comparing to the prior art, the display panel in accordance with the present invention comprises multiple pixels arranged in a matrix. A TFT corresponding to the pixels are driven by AC voltage. Each pixel includes a first color sub-pixel, a second color sub-pixel and a third color sub-pixel arranged in sequence along a first direction. The first color sub-pixel includes a first sub-sub pixel and a second sub-sub pixel arranged along a second direction. The second color sub-pixel includes a third sub-sub pixel and a fourth sub-sub pixel arranged along a second direction. The third color sub-pixel includes a fifth sub-sub pixel and a sixth sub-sub pixel arranged along a second direction. The adjacent sub-sub pixels are supplied different voltages with opposite polarities. When polarity of the voltage supplied to the sub-sub pixels of each sub-pixel is changed, the sum of the brightness of the two sub-sub pixels of each sub-pixel are the same before and after the polarity of the voltage is changed. Since the corresponding TFT of the pixels in the display panel in accordance with the present invention is driven the AC voltage, the display panel is kept from forming image sticking when the voltages have different polarities.

Furthermore, the present invention divides the sub-pixel into two sub-sub pixels. When the polarities of the supplied voltages to the sub-sub pixels of each sub-pixel are changed, the sum of the brightness of the sub-sub pixels of each sub-pixel remains the same after the polarities of the voltages are changed. Thus, when the display panel displays images, the images are kept from flickering.

Furthermore, the arrangement of the sharing TFT enhances the charging efficiency of the display panel. Since the gate of the sharing TFT on the next row and the gate of the sharing TFT on the previous row connect to the same gate line, the electric charges are shared to the two sub-sub pixels of the sub-pixel on the next row when the sharing TFT on the previous row is charged. Thus, the charging efficiency of the next row is enhanced to reduce the logic power consumption of the display panel.

BRIEF DESCRIPTION OF THE DRAWINGS

In order to more clearly illustrate the embodiments of the present invention or prior art, the following figures will be described in the embodiments are briefly introduced. It is obvious that the drawings are merely some embodiments of the present invention, those of ordinary skill in this field can obtain other figures according to these figures without paying the premise.

DETAILED DESCRIPTION OF THE PREFERRED EMBODIMENTS

Embodiments of the present invention are described in detail with the technical matters, structural features, achieved objects, and effects with reference to the accompanying drawings as follows. It is clear that the described embodiments are part of embodiments of the present invention, but not all embodiments. Based on the embodiments of the present invention, all other embodiments to those of ordinary skill in the premise of no creative efforts obtained, should be considered within the scope of protection of the present invention.

Figure 1:
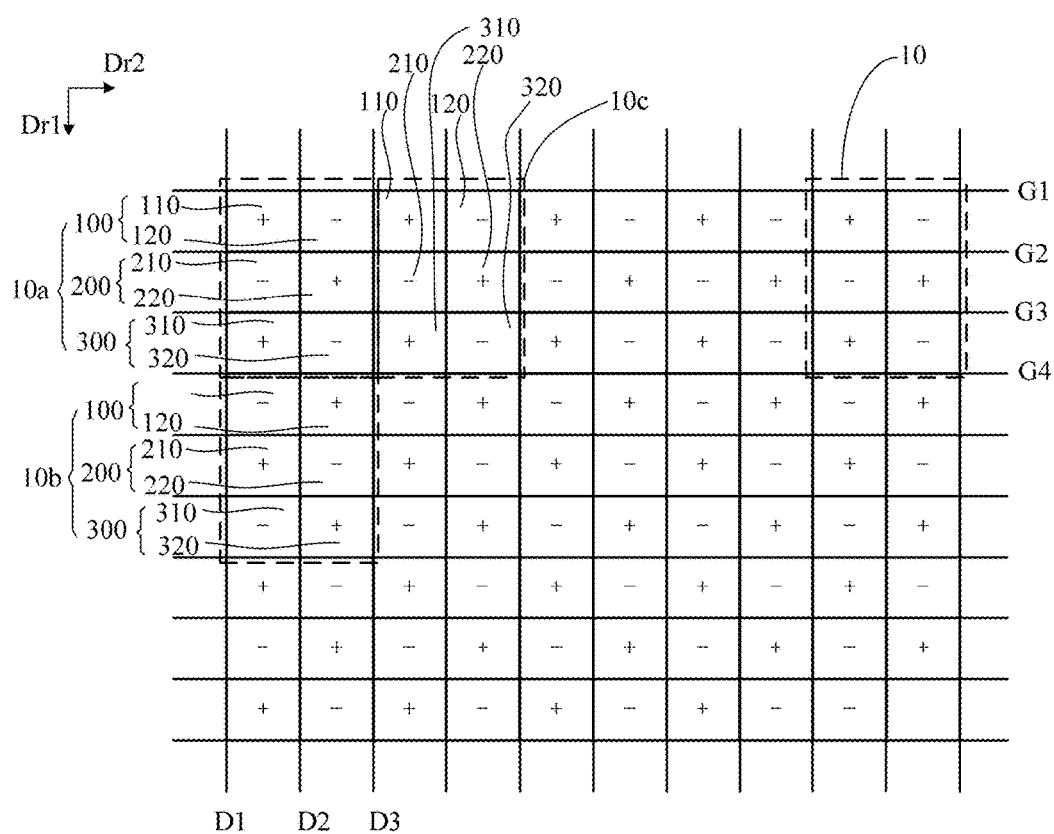
FIG. 1 is an illustrative view of the structure of a preferred embodiment of a display panel in accordance with the present invention.

With reference to FIG. 1, FIG. 1 is an illustrative view of the structure of a preferred embodiment of a display panel in accordance with the present invention. The display panel 1 comprises multiple pixels 10 arranged in a matrix. A TFT corresponding to the pixels 10 are driven by AC voltage. Each pixel 10 includes a first color sub-pixel 100, a second color sub-pixel 200 and a third color sub-pixel 300 arranged in sequence along a first direction Dr1. The first color sub-pixel 100 includes a first sub-sub pixel 110 and a second sub-sub pixel 120 arranged along a second direction Dr2. The second color sub-pixel 200 includes a third sub-sub pixel 210 and a fourth sub-sub pixel 220 arranged along a second direction Dr2. The third color sub-pixel 300 includes a fifth sub-sub pixel 310 and a sixth sub-sub pixel 320 arranged along a second direction Dr2. The adjacent sub-sub pixels are supplied different voltages with opposite polarities. Specifically, the adjacent sub-sub pixels of each pixel are supplied different voltages with opposite polarities, and the adjacent sub-sub pixels of adjacent pixels are supplied different voltages with opposite polarities. When polarity of the voltage supplied to the sub-sub pixels of each sub-pixel is changed, the sum of the brightness of the two sub-sub pixels of each sub-pixel are the same before and after the polarity of the voltage is changed.

The first color sub-pixels 100, the second color sub-pixels 200 and the third color sub-pixels 300 are random combinations of red R, green G and blue B. In one embodiment, the first color sub-pixels 100, the second color sub-pixels 200 and the third color sub-pixels 300 are respectively red, green and blue. In another embodiment, the first color sub-pixels 100, the second color sub-pixels 200 and the third color sub-pixels 300 are respectively green, blue and red. In another embodiment, the first color sub-pixels 100, the second color sub-pixels 200 and the third color sub-pixels 300 are respectively blue, red and green. It can be understand that the first color sub-pixels 100, the second color sub-pixels 200 and the third color sub-pixels 300 of the pixels 10 are not limited to the aforementioned combination of R, G, B.

In one embodiment, the first direction Dr1 aligns with a column direction and the second direction aligns with a row direction. It can be understand that in another embodiment, the first direction Dr1 aligns with a row direction and the second direction aligns with a column direction.

Specifically, three adjacent pixels are used as an example below to describe each sub-sub pixel supplied voltages with opposite polarities. For easily description, the three adjacent pixels are represented respectively as 10a, 10b and 10C. The pixel 10a and the pixel 10b are arranged along the first direction Dr1. the pixel 10a and the pixel 10c are arranged along the second direction Dr2. In the pixel 10a, the first sub-sub pixel 110 is supplied a positive voltage. In FIG. 1, the positive voltage is represented as "+". The second sub-sub pixel 120 is supplied a negative voltage. In FIG. 1, the negative voltage is represented as "−". The third sub-sub pixel 210 is arranged adjacent to the first sub-sub pixel 110 and the third sub-sub pixel 210 is supplied a negative voltage. The fourth sub-sub pixel 220 is arranged adjacent to the second sub-sub pixel 120 and the fourth sub-sub pixel 220 is supplied a positive voltage. The fifth sub-sub pixel 310 is arranged adjacent to the third sub-sub pixel 110 and the fifth sub-sub pixel 310 is supplied a positive voltage. The sixth sub-sub pixel 320 is arranged adjacent to the fourth sub-sub pixel 220 and the sixth sub-sub pixel 320 is supplied a negative voltage. This shows that in the pixel 10a, the adjacent sub-sub pixels are supplied voltages with opposite polarities.

The polarities of the voltages supplied to each sub-sub pixels in the pixel 10b are introduced below. In the pixel 10b, the first sub-sub pixel 110 is arranged adjacent to the fifth sub-sub pixel 310 of the pixel 10a, and the first sub-sub pixel 110 of the pixel 10b is supplied a negative voltage. The second sub-sub pixel 120 is arranged adjacent to the sixth sub-sub pixel 320 of the pixel 10a, and the second sub-sub pixel 120 of the pixel 10b is supplied a positive voltage. The third sub-sub pixel 210 of pixel 10b is arranged adjacent to the first sub-sub pixel 110 and the third sub-sub pixel 210 is supplied a positive voltage. The fourth sub-sub pixel 220 of the pixel 10b is arranged adjacent to the second sub-sub pixel 120 and the fourth sub-sub pixel 220 is supplied a negative voltage. The fifth sub-sub pixel 310 of the pixel 10b is arranged adjacent to the third sub-sub pixel 110 and the fifth sub-sub pixel 310 is supplied a negative voltage. The sixth sub-sub pixel 320 of the pixel 10b is arranged adjacent to the fourth sub-sub pixel 220 and the sixth sub-sub pixel 320 is supplied a positive voltage. This shows that in the pixel 10b, the adjacent sub-sub pixels are supplied voltages with opposite polarities. The adjacent sub-pixels of the pixel 10b and pixel 10a are supplied voltages with opposite polarities. In other words, the first sub-sub pixel 110 and the second sub-sub pixel 120 in the pixel 10b are respectively adjacent to the fifth sub-sub pixel 310 and the sixth sub-sub pixel 320 in the pixel 10a. The first sub-sub pixel 110 in the pixel 10b and the fifth sub-sub pixel 310 in the pixel 10a are supplied voltages with opposite polarities. The second sub-sub pixel 120 in the pixel 10b and the sixth sub-sub pixel 320 in the pixel 10a are supplied voltages with opposite polarities.

The polarities of the voltages supplied to each sub-sub pixels in the pixel 10c are introduced below. In the pixel 10c, the first sub-sub pixel 110 is arranged adjacent to the second sub-sub pixel 120 of the pixel 10a, and the first sub-sub pixel 110 of the pixel 10c is supplied a positive voltage. The second sub-sub pixel 120 of the pixel 10c is arranged adjacent to the first sub-sub pixel 110 of the pixel 10c, and the second sub-sub pixel 120 of the pixel 10c is supplied a negative voltage. The third sub-sub pixel 210 of pixel 10c is arranged adjacent to the fourth sub-sub pixel 220 of the pixel 10a and the third sub-sub pixel 210 of the pixel 10c is supplied a negative voltage. The fourth sub-sub pixel 220 of the pixel 10c is arranged adjacent to the third sub-sub pixel 210 of the pixel 10c and the fourth sub-sub pixel 220 of the pixel 10c is supplied a positive voltage. The fifth sub-sub pixel 310 of the pixel 10c is arranged adjacent to the sixth sub-sub pixel 320 of the pixel 10a and the fifth sub-sub pixel 310 of the pixel 10c is supplied a positive voltage. The sixth sub-sub pixel 320 of the pixel 10c is arranged adjacent to the fifth sub-sub pixel 310 of the pixel 10c and the sixth sub-sub pixel 320 of the pixel 10c is supplied a negative voltage. This shows that in the pixel 10c, the adjacent sub-sub pixels are supplied voltages with opposite polarities. The adjacent sub-pixels of the pixel 10c and pixel 10a are supplied voltages with opposite polarities.

In the pixel 10, when the first sub-sub pixel 110 and the second sub-sub pixel 120 are supplied respectively a first polarity voltage and a second polarity voltage, the sum of the brightness of the first sub-sub pixel 110 and the second sub-sub pixel 120 is a first brightness. When the first sub-sub pixel 110 and the second sub-sub pixel 120 are supplied respectively a second polarity voltage and a first polarity voltage, the sum of the brightness of the first sub-sub pixel 110 and the second sub-sub pixel 120 is a second brightness. The first brightness is equal to the second brightness. The voltage values of the first polarity voltage and the second polarity voltage are the same but the polarities of the first polarity voltage and the second polarity voltage are opposite. When the polarity of the first polarity voltage is positive, the polarity of the second polarity voltage is negative. When the polarity of the first polarity voltage is negative, the polarity of the second polarity voltage is positive.

When the third sub-sub pixel 210 and the fourth sub-sub pixel 220 are supplied respectively a first polarity voltage and a second polarity voltage, the sum of the brightness of the third sub-sub pixel 210 and the fourth sub-sub pixel 220 is a third brightness. When the third sub-sub pixel 210 and the fourth sub-sub pixel 220 are supplied respectively a second polarity voltage and a first polarity voltage, the sum of the brightness of the third sub-sub pixel 210 and the fourth sub-sub pixel 220 is a fourth brightness. The third brightness is equal to the fourth brightness.

When the fifth sub-sub pixel 310 and the six sub-sub pixel 320 are supplied respectively a first polarity voltage and a second polarity voltage, the sum of the brightness of the fifth sub-sub pixel 310 and the sixth sub-sub pixel 320 is a fifth brightness. When the fifth sub-sub pixel 310 and the six sub-sub pixel 320 are supplied respectively a second polarity voltage and a first polarity voltage, the sum of the brightness of the fifth sub-sub pixel 310 and the sixth sub-sub pixel 320 is a sixth brightness. The fifth brightness is equal to the sixth brightness.

Figure 2:
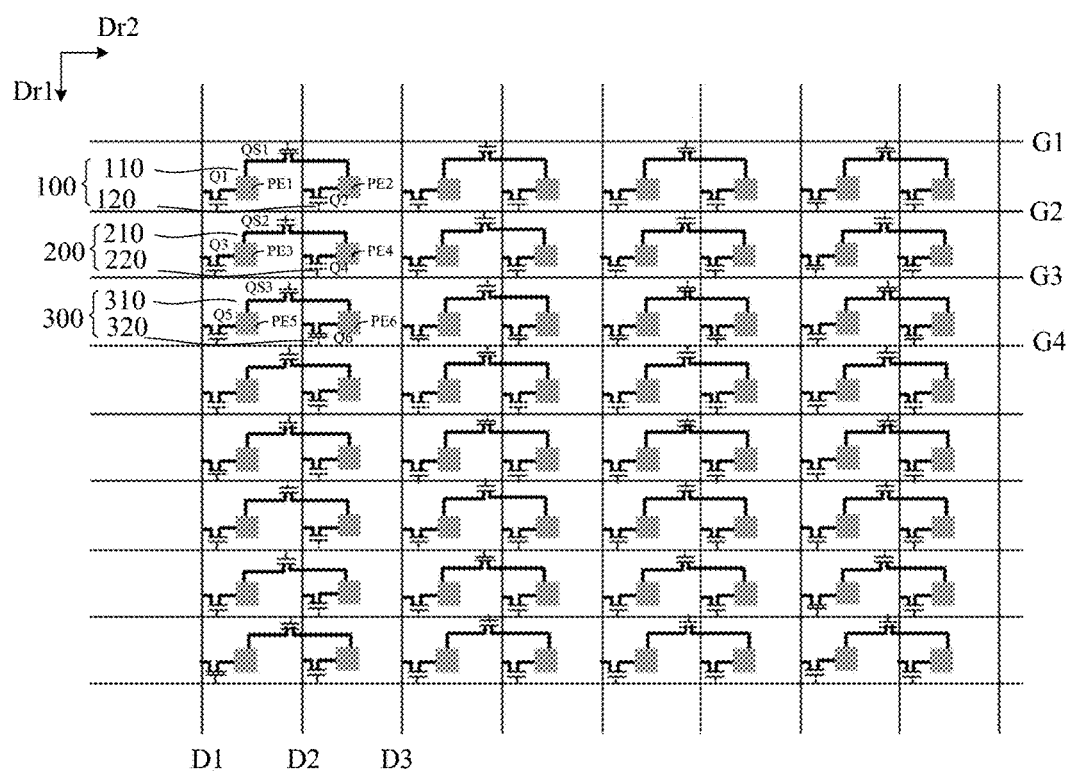
FIG. 2 is an illustrative view of a driving circuit of a preferred embodiment of a display panel in accordance with the present invention.

With reference to FIG. 2, FIG. 2 is an illustrative view of a driving circuit of a preferred embodiment of a display panel in accordance with the present invention. The display panel 1 comprises multiple data lines and multiple gate lines arranged in a matrix. Each data line aligns with the first direction Dr1. Each gate line aligns with the second direction Dr2. Each first color sub-pixel 100 corresponds to a first sharing TFT QS1, a first TFT Q1 and a second TFT Q2. The first sharing TFT QS1, the first TFT Q1 and the second TFT Q2 respectively have a gate, a source and a drain. The gate of the first sharing TFT QS1 electrically connects to a first gate line G1. The drain and the source of the first sharing TFT QS1 respectively connect to a pixel electrode PE1 of the first sub-sub pixel 110 and a pixel electrode PE2 of the second sub-sub pixel 120. The gate, the source and the drain of the first TFT Q1 respectively connect to a second gate line G2, a first data line D1 and the pixel electrode PE1 of the first sub-sub pixel 110. The gate, the source and the drain of the second TFT Q2 respectively connect to the second gate line G2, a second data line D2 and the pixel electrode PE2 of the second sub-sub pixel 120. The arrangement of the first sharing TFT QS1 enhances the charging efficiency of the display panel 1.

Each second color sub-pixel 200 corresponds to a second sharing TFT QS2, a third TFT Q3 and a fourth TFT Q4. The gate of the second sharing TFT QS2 electrically connects to the second gate line G2. The drain and the source of the second sharing TFT QS2 respectively connect to a pixel electrode PE3 of the third sub-sub pixel 210 and a pixel electrode PE4 of the fourth sub-sub pixel 220. The gate, the source and the drain of the third TFT Q3 respectively connect to a third gate line G3, the first data line D1 and the pixel electrode PE3 of the third sub-sub pixel 210. The gate, the source and the drain of the fourth TFT Q4 respectively connect to the third gate line G3, the second data line D2 and the pixel electrode PE4 of the fourth sub-sub pixel 220. The arrangement of the second sharing TFT QS2 enhances the charging efficiency of the display panel 10.

Each third color sub-pixel 300 corresponds to a third sharing TFT QS3, a fifth TFT Q5 and a sixth TFT Q6. The gate of the third sharing TFT QS3 electrically connects to the third gate line G3. The drain and the source of the third sharing TFT QS3 respectively connect to a pixel electrode PE5 of the fifth sub-sub pixel 310 and a pixel electrode PE6 of the sixth sub-sub pixel 320. The gate, the source and the drain of the fifth TFT Q5 respectively connect to a fourth gate line G4, the first data line D1 and the pixel electrode PE5 of the fifth sub-sub pixel 310. The gate, the source and the drain of the sixth TFT Q6 respectively connect to the fourth gate line G4, the second data line D2 and the pixel electrode PE6 of the sixth sub-sub pixel 320. The arrangement of the third sharing TFT QS3 enhances the charging efficiency of the display panel 10.

Comparing to the prior art, the display panel 1 in accordance with the present invention comprises multiple pixels 10 arranged in a matrix. A TFT corresponding to the pixels 10 are driven by AC voltage. Each pixel 10 includes a first color sub-pixel 100, a second color sub-pixel 200 and a third color sub-pixel 300 arranged in sequence along a first direction Dr1. The first color sub-pixel 100 includes a first sub-sub pixel 110 and a second sub-sub pixel 120 arranged along a second direction Dr2. The second color sub-pixel 200 includes a third sub-sub pixel 210 and a fourth sub-sub pixel 220 arranged along a second direction Dr2. The third color sub-pixel 300 includes a fifth sub-sub pixel 310 and a sixth sub-sub pixel 320 arranged along a second direction Dr2. The adjacent sub-sub pixels are supplied different voltages with opposite polarities. When polarity of the voltage supplied to the sub-sub pixels of each sub-pixel is changed, the sum of the brightness of the two sub-sub pixels of each sub-pixel are the same before and after the polarity of the voltage is changed. Since the corresponding TFT of the pixels in the display panel in accordance with the present invention is driven the AC voltage, the display panel 1 is kept from forming image sticking when the voltages have different polarities.

Furthermore, the present invention divides the sub-pixel into two sub-sub pixels. When the polarities of the supplied voltages to the sub-sub pixels of each sub-pixel are changed, the sum of the brightness of the sub-sub pixels of each sub-pixel remains the same after the polarities of the voltages are changed. Thus, when the display panel displays images, the images are kept from flickering.

Furthermore, the arrangement of the sharing TFT enhances the charging efficiency of the display panel 1. Since the gate of the sharing TFT on the next row and the gate of the sharing TFT on the previous row connect to the same gate line, the electric charges are shared to the two sub-sub pixels of the sub-pixel on the next row when the sharing TFT on the previous row is charged. Thus, the charging efficiency of the next row is enhanced to reduce the logic power consumption of the display panel 1. For example, the gate of the second sharing TFT QS2, the gate of the first TFT Q1 and the gate of the second TFT Q2 are connected to the same gate line (here is the first gate line G1). Therefore, when the first sub-sub pixel 110 and the second sub-sub pixel 120 are charged respectively through the first TFT Q1 and the second TFT Q2, the second sharing TFT QS2 shares electric charges with the third TFT Q3 and the fourth TFT Q4. Thus, the charging efficiency of the third TFT Q3 and the fourth TFT Q4 is enhanced to reduce the logic power consumption of the display panel 1.

Figure 3:
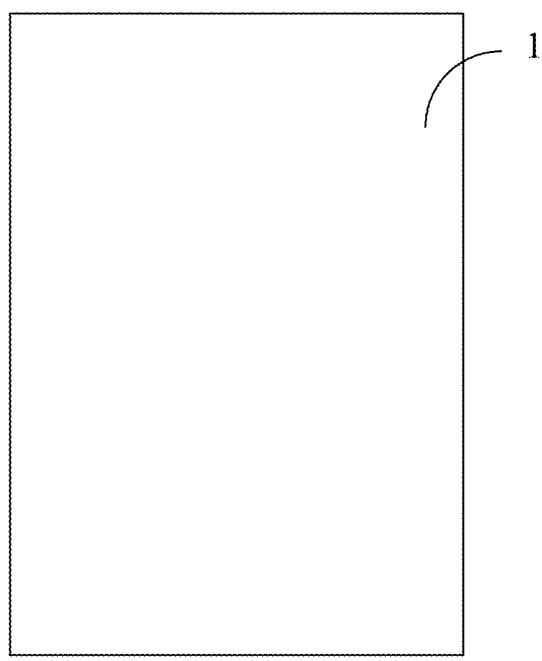
FIG. 3 is an illustrative view of the structure of a preferred embodiment of a display device in accordance with the present invention.

Following the display device in accordance with the present invention is introduced with FIGS. 1 and 2 and aforementioned description. With reference to FIG. 3, FIG. 3 is an illustrative view of the structure of a preferred embodiment of a display device in accordance with the present invention. The display device 2 comprises the aforementioned display panel 1. The display panel 1 is described above and is not described more here.

Above are embodiments of the present invention, which does not limit the scope of the present invention. Any modifications, equivalent replacements or improvements within the spirit and principles of the embodiment described above should be covered by the protected scope of the invention.

What is claimed is:

1. A display panel, wherein: the display panel comprises multiple pixels arranged in a matrix; a thin film transistor (TFT) corresponding to the pixels is driven by AC voltage; each pixel includes a first color sub-pixel, a second color sub-pixel and a third color sub-pixel arranged in sequence along a first direction; the first color sub-pixel includes a first sub-sub pixel and a second sub-sub pixel arranged along a second direction; the second color sub-pixel includes a third sub-sub pixel and a fourth sub-sub pixel arranged along the second direction; the third color sub-pixel includes a fifth sub-sub pixel and a sixth sub-sub pixel arranged along the second direction; the adjacent sub-sub pixels are supplied different voltages with opposite polarities; when the voltage supplied to the sub-sub pixels of each sub-pixel is changed in polarity, the sum of the brightness of the two sub-sub pixels of each sub-pixel are the same before and after the voltage is changed in polarity;

wherein, when the first sub-sub pixel and the second sub-sub pixel are supplied respectively a first polarity voltage and a second polarity voltage, the sum of the brightness of the first sub-sub pixel and the second sub-sub pixel is a first brightness; when the first sub-sub pixel and the second sub-sub pixel are supplied respectively the second polarity voltage and the first polarity voltage, the sum of the brightness of the first sub-sub pixel and the second sub-sub pixel is a second brightness; the first brightness is equal to the second brightness; wherein voltage amplitudes of the first polarity voltage and the second polarity voltage are the same but polarities of the first polarity voltage and the second polarity voltage are opposite.

2. The display panel according to claim 1, wherein: the display panel comprises multiple data lines and multiple gate lines arranged in a matrix; each data line aligns with the first direction; each gate line aligns with the second direction; each first color sub-pixel corresponds to a first sharing TFT, a first TFT and a second TFT; a gate of the first sharing TFT electrically connects to a first gate line; a drain and a source of the first sharing TFT respectively connect to a pixel electrode of the first sub-sub pixel and a pixel electrode of the second sub-sub pixel; a gate, a source and a drain of the first TFT respectively connect to a second gate line, a first data line and the pixel electrode of the first sub-sub pixel; a gate, a source and a drain of the second TFT respectively connect to the second gate line, a second data line and the pixel electrode of the second sub-sub pixel.

3. The display panel according to claim 2, wherein: when the third sub-sub pixel and the fourth sub-sub pixel are supplied respectively the first polarity voltage and the second polarity voltage, the sum of the brightness of the third sub-sub pixel and the fourth sub-sub pixel is a third brightness; when the third sub-sub pixel and the fourth sub-sub pixel are supplied respectively the second polarity voltage and the first polarity voltage, the sum of the brightness of the third sub-sub pixel and the fourth sub-sub pixel is a fourth brightness; wherein the third brightness is equal to the fourth brightness.

4. The display panel according to claim 3, wherein: each second color sub-pixel corresponds to a second sharing TFT, a third TFT and a fourth TFT; a gate of the second sharing TFT electrically connects to the second gate line; a drain and a source of the second sharing TFT respectively connect to a pixel electrode of the third sub-sub pixel and a pixel electrode of the fourth sub-sub pixel; a gate, a source and a drain of the third TFT respectively connect to a third gate line, the first data line and the pixel electrode of the third sub-sub pixel; a gate, a source and a drain of the fourth TFT respectively connect to the third gate line, the second data line and the pixel electrode of the fourth sub-sub pixel.

5. The display panel according to claim 4, wherein: when the fifth sub-sub pixel and the sixth sub-sub pixel are supplied respectively the first polarity voltage and the second polarity voltage, the sum of the brightness of the fifth sub-sub pixel and the sixth sub-sub pixel is a fifth brightness; when the fifth sub-sub pixel and the sixth sub-sub pixel are supplied respectively the second polarity voltage and the first polarity voltage, the sum of the brightness of the fifth sub-sub pixel and the sixth sub-sub pixel is a sixth brightness; wherein the fifth brightness is equal to the sixth brightness.

6. The display panel according to claim 5, wherein: each third color sub-pixel corresponds to a third sharing TFT, a fifth TFT and a sixth TFT; a gate of the third sharing TFT electrically connects to the third gate; a drain and a source of the third sharing TFT respectively connect to a pixel electrode of the fifth sub-sub pixel and a pixel electrode of the sixth sub-sub pixel; a gate, a source and a drain of the fifth TFT respectively connect to a fourth gate line, the first data line and the pixel electrode of the fifth sub-sub pixel; a gate, a source and a drain of the sixth TFT respectively connect to the fourth gate line, the second data line and the pixel electrode of the sixth sub-sub pixel.

7. The display panel according to claim 1, wherein the first color sub-pixels, the second color sub-pixels and the third color pixels are respectively red, green and blue in any combination.

8. The display panel according to claim 1, wherein the first direction is a row direction and the second direction is a column direction.

9. The display panel according to claim 1, wherein the first direction is a column direction and the second direction is a row direction.

10. A display device, wherein: the display device comprises a display panel; the display panel comprises multiple pixels arranged in a matrix; a TFT corresponding to the pixels is driven by AC voltage; each pixel includes a first color sub-pixel, a second color sub-pixel and a third color sub-pixel arranged in sequence along a first direction; the first color sub-pixel includes a first sub-sub pixel and a second sub-sub pixel arranged along a second direction; the second color sub-pixel includes a third sub-sub pixel and a fourth sub-sub pixel arranged along the second direction; the third color sub-pixel includes a fifth sub-sub pixel and a sixth sub-sub pixel arranged along the second direction; the adjacent sub-sub pixels are supplied different voltages with opposite polarities; when the voltage supplied to the sub-sub pixels of each sub-pixel is changed in polarity, the sum of the brightness of the two sub-sub pixels of each sub-pixel are the same before and after the voltage is changed in polarity;

wherein, when the first sub-sub pixel and the second sub-sub pixel are supplied respectively a first polarity voltage and a second polarity voltage, the sum of the brightness of the first sub-sub pixel and the second sub-sub pixel is a first brightness; when the first sub-sub pixel and the second sub-sub pixel are supplied respectively the second polarity voltage and the first polarity voltage, the sum of the brightness of the first sub-sub pixel and the second sub-sub pixel is a second brightness; the first brightness is equal to the second brightness; wherein voltage amplitudes of the first polarity voltage and the second polarity voltage are the same but polarities of the first polarity voltage and the second polarity voltage are opposite.

11. The display device according to claim 10, wherein: the display panel comprises multiple data lines and multiple gate lines arranged in a matrix; each data line aligns with the first direction; each gate line aligns with the second direction; each first color sub-pixel corresponds to a first sharing TFT, a first TFT and a second TFT; a gate of the first sharing TFT electrically connects to a first gate line; a drain and a source of the first sharing TFT respectively connect to a pixel electrode of the first sub-sub pixel and a pixel electrode of the second sub-sub pixel; a gate, a source and a drain of the first TFT respectively connect to a second gate line, a first data line and the pixel electrode of the first sub-sub pixel; a gate, a source and a drain of the second TFT respectively connect to the second gate line, a second data line and the pixel electrode of the second sub-sub pixel.

12. The display device according to claim 11, wherein: when the third sub-sub pixel and the fourth sub-sub pixel are supplied respectively the first polarity voltage and the second polarity voltage, the sum of the brightness of the third sub-sub pixel and the fourth sub-sub pixel is a third brightness; when the third sub-sub pixel and the fourth sub-sub pixel are supplied respectively the second polarity voltage and the first polarity voltage, the sum of the brightness of the third sub-sub pixel and the fourth sub-sub pixel is a fourth brightness; wherein the third brightness is equal to the fourth brightness.

13. The display device according to claim 12, wherein: each second color sub-pixel corresponds to a second sharing TFT, a third TFT and a fourth TFT; a gate of the second sharing TFT electrically connects to the second gate line; a drain and a source of the second sharing TFT respectively connect to a pixel electrode of the third sub-sub pixel and a pixel electrode of the fourth sub-sub pixel; a gate, a source and a drain of the third TFT respectively connect to a third gate line, the first data line and the pixel electrode of the third sub-sub pixel; a gate, a source and a drain of the fourth TFT respectively connect to the third gate line, the second data line and the pixel electrode of the fourth sub-sub pixel.

14. The display device according to claim 13, wherein: when the fifth sub-sub pixel and the sixth sub-sub pixel are supplied respectively the first polarity voltage and the second polarity voltage, the sum of the brightness of the fifth sub-sub pixel and the sixth sub-sub pixel is a fifth brightness; when the fifth sub-sub pixel and the sixth sub-sub pixel are supplied respectively the second polarity voltage and the first polarity voltage, the sum of the brightness of the fifth sub-sub pixel and the sixth sub-sub pixel is a sixth brightness; wherein the fifth brightness is equal to the sixth brightness.

15. The display device according to claim 14, wherein: each third color sub-pixel corresponds to a third sharing TFT, a fifth TFT and a sixth TFT; a gate of the third sharing TFT electrically connects to the third gate; a drain and a source of the third sharing TFT respectively connect to a pixel electrode of the fifth sub-sub pixel and a pixel electrode of the sixth sub-sub pixel; a gate, a source and a drain of the fifth TFT respectively connect to a fourth gate line, the first data line and the pixel electrode of the fifth sub-sub pixel; a gate, a source and a drain of the sixth TFT respectively connect to the fourth gate line, the second data line and the pixel electrode of the sixth sub-sub pixel.

16. The display device according to claim 10, wherein the first color sub-pixels, the second color sub-pixels and the third color pixels are red, green and blue in any combination.

17. The display device according to claim 10, wherein the first direction is a row direction and the second direction is a column direction.

18. The display device according to claim 10, wherein the first direction is a column direction and the second direction is a row direction.

* * * * *